United States Patent
Xu et al.

(10) Patent No.: US 10,776,225 B2
(45) Date of Patent: Sep. 15, 2020

(54) PROACTIVE CLUSTER COMPUTE NODE MIGRATION AT NEXT CHECKPOINT OF CLUSTER CLUSTER UPON PREDICTED NODE FAILURE

(71) Applicant: Hewlett Packard Enterprise Development LP, Houston, TX (US)

(72) Inventors: Cong Xu, Palo Alto, CA (US); Naveen Muralimanohar, Palo Alto, CA (US); Harumi Kuno, Cupertino, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 225 days.

(21) Appl. No.: 16/022,990

(22) Filed: Jun. 29, 2018

(65) Prior Publication Data
US 2020/0004648 A1 Jan. 2, 2020

(51) Int. Cl.
*G06F 11/20* (2006.01)
*G06F 11/14* (2006.01)
*G06F 11/07* (2006.01)
*G06F 11/00* (2006.01)
*G06F 11/36* (2006.01)
*G06F 9/48* (2006.01)
(Continued)

(52) U.S. Cl.
CPC ...... *G06F 11/2028* (2013.01); *G06F 9/45558* (2013.01); *G06F 9/4856* (2013.01); *G06F 9/522* (2013.01); *G06F 9/542* (2013.01); *G06F 11/008* (2013.01); *G06F 11/0757* (2013.01); *G06F 11/1407* (2013.01); *G06F 11/203* (2013.01); *G06F 11/3688* (2013.01); *G06F 11/3692* (2013.01); *G06N 20/00* (2019.01); *G06F 2009/4557* (2013.01); *G06F 2201/81* (2013.01)

(58) Field of Classification Search
CPC .... G06F 11/20; G06F 11/2028; G06F 11/008; G06F 11/0757; G06F 11/1407; G06F 11/203
USPC ........................................ 714/4.11
See application file for complete search history.

(56) References Cited

U.S. PATENT DOCUMENTS

| 6,978,398 B2 * | 12/2005 | Harper | G06F 11/2035 |
|---|---|---|---|
| | | | 714/13 |
| 8,312,318 B2 * | 11/2012 | Graham | G06F 11/1484 |
| | | | 714/11 |

(Continued)

OTHER PUBLICATIONS

Qasem, G.M. et al., "Proactive Fault Tolerance in Cloud Data Centers for Performance Efficiency", International Journal of Pure and Applied Mathematics, vol. 117 No. 22 2017, 325-329, < http://acadpubl.eu/jsi/2017-117-20-22/articles/22/62.pdf >.

(Continued)

*Primary Examiner* — Kamini B Patel
(74) *Attorney, Agent, or Firm* — Michael A. Dryja

(57) ABSTRACT

While scheduled checkpoints are being taken of a cluster of active compute nodes distributively executing an application in parallel, a likelihood of failure of the active compute nodes is periodically and independently predicted. Responsive to the likelihood of failure of a given active compute node exceeding a threshold, the given active compute node is proactively migrated to a spare compute node of the cluster at a next scheduled checkpoint. Another spare compute node of the cluster can perform prediction and migration. Prediction can be based on both hardware events and software events regarding the active compute nodes.

16 Claims, 4 Drawing Sheets

(51) Int. Cl.
  *G06F 9/52*   (2006.01)
  *G06F 9/54*   (2006.01)
  *G06F 9/455*  (2018.01)
  *G06N 20/00*  (2019.01)

(56) References Cited

U.S. PATENT DOCUMENTS

| | | | |
|---|---|---|---|
| 9,348,710 B2 | 5/2016 | Al-wahabi | |
| 9,483,338 B2 * | 11/2016 | Bhalla | H04L 41/147 |
| 2006/0155912 A1 * | 7/2006 | Singh | G06F 9/5088 |
| | | | 711/6 |
| 2008/0126881 A1 * | 5/2008 | Bruckhaus | G06F 11/008 |
| | | | 714/47.2 |
| 2009/0067334 A1 * | 3/2009 | Archer | G06F 9/461 |
| | | | 370/238 |
| 2016/0034362 A1 * | 2/2016 | Al-Wahabi | G06F 11/1407 |
| | | | 714/4.1 |
| 2017/0149687 A1 * | 5/2017 | Udupi | H04L 67/1002 |

OTHER PUBLICATIONS

Xue, Z. et al., "A Survey on Failure Prediction of Large-Scale Server ", Eighth ACIS International Conference on Software Engineering, Artificial Intelligence, Networking, and Parallel/Distributed Computing, 2007, < https://pdfs.semanticscholar.org/6ce8/681c8e34d74aae97545ebfec78cf831271fd.pdf >.

* cited by examiner

PROACTIVE CLUSTER COMPUTE NODE MIGRATION AT NEXT CHECKPOINT OF CLUSTER CLUSTER UPON PREDICTED NODE FAILURE

BACKGROUND

Traditionally a computer program, like an application computer program, has been executed on a single computing device, such as a server. While the per-processor costs of computing devices have greatly decreased, advances in performance have slowed. Therefore, more recently, multiple computing devices have begun to be used to distributively execute a computer program in parallel. Large numbers of computing devices have even more recently still been clustered to provide massively parallel processing of computer programs, permitting such clusters to rival the performance of conventional supercomputers.

DETAILED DESCRIPTION

Figure 1:
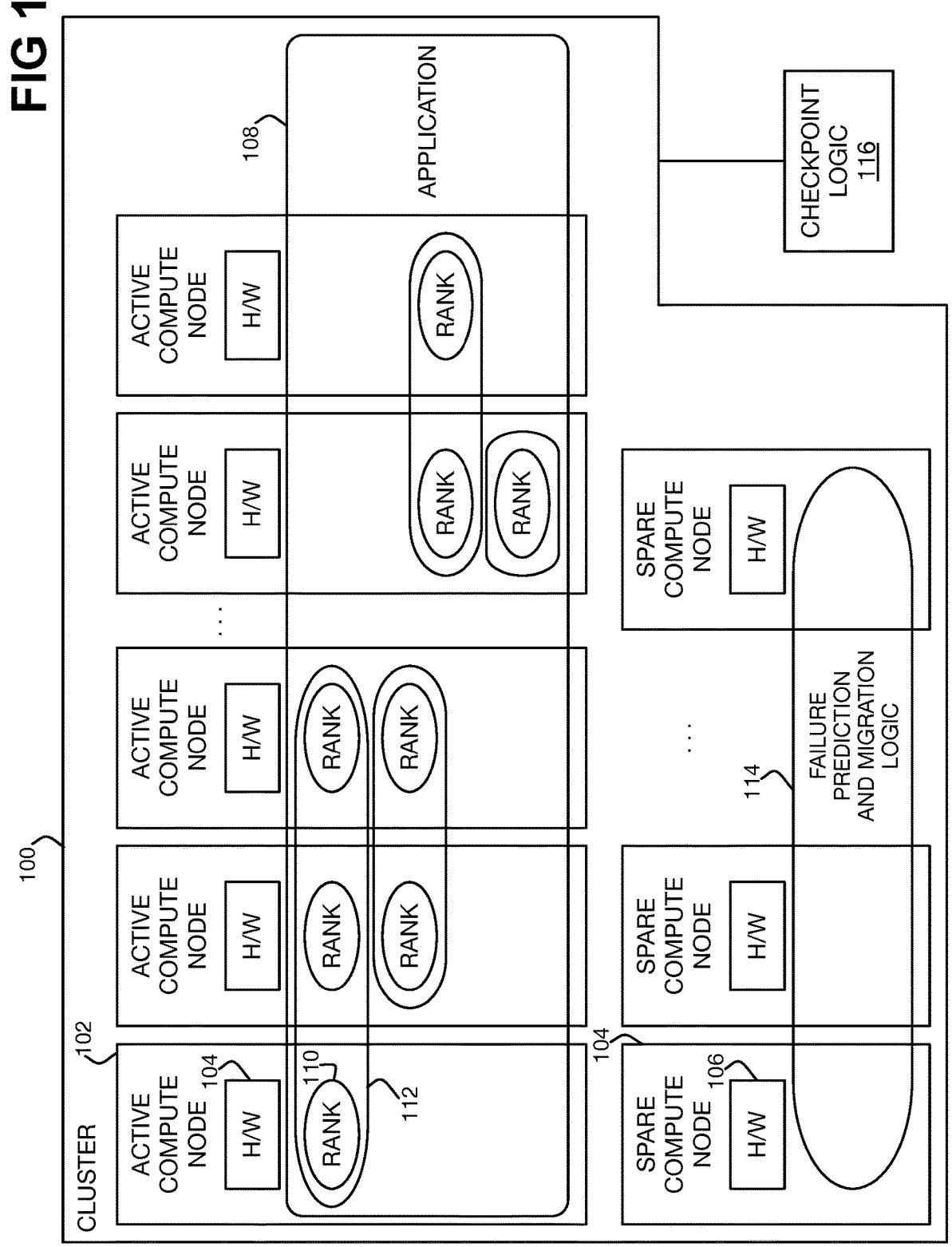
FIG. 1 is a diagram of an example cluster including includes active and spare compute nodes.

As noted in the background section, a cluster of a large number of computing devices can provide massively parallel processing of a computer program that rivals the performance of conventional supercomputers. The individual computing devices of such a cluster can be referred to as compute nodes, and may each be a separate server, such as a blade server, having a processor, network connectivity, and memory. The computing devices in a cluster can number in the thousands, tens of thousands, or even more.

Such a high performance computing (HPC) cluster means that even when utilizing individual compute nodes of the utmost reliability, the cluster will likely experience a compute node failing every few hours. Therefore, a cluster has fault tolerance to accommodate such failures. That is, owing to the law of large numbers, compute node failure is a regular occurrence within clusters of large numbers of compute nodes, and thus clusters are designed a priori with fault tolerance to compensate.

A common approach to instilling an HPC cluster with fault tolerance is checkpointing. A cluster may include active compute nodes that are actively distributively executing an application in parallel, and spare compute nodes that standby ready to take over for active compute nodes that fail. The application can be hardcoded or otherwise configured to regularly pause, so that a current state of each active node can be recorded.

When an active compute node fails, the other active compute nodes stop their current processing, and are rolled back to their states as reflected in the most recent checkpoint. A spare compute node takes over for the failed compute node. The state of the now-failed compute node at the most recent checkpoint is loaded onto the spare compute node, which thus becomes an active compute node. The cluster can then resume processing of the application.

This approach, however, means that the processing on all the active compute nodes from the most recent checkpoint to when the active compute node in question failed is lost. Such a drag on HPC cluster performance is in addition to the overhead occurred by the checkpointing itself, which can reduce overall performance by 10%. Further, costs are incurred by having to have a sufficient number of spare compute nodes that stand ready to take over for failed compute nodes but which remain idle until they do so.

Described herein are techniques that ameliorate these shortcomings. While checkpoints are regularly being taken of a cluster of active compute nodes distributively executing an application in parallel, the likelihood of failure of each computing node is periodically predicted, such as based on both hardware and software events regarding the cluster. The checkpoints may be regularly taken in that they are taken according to a schedule. The likelihood of failure prediction can be performed by using machine learning, and further can be performed independently of when the checkpoints are taken, and may not affect when the checkpoints are taken. That is, the prediction can be performed independently of the schedule according to which the checkpoints are taken.

When the likelihood of failure of a given active compute node exceeds a threshold, the node is proactively migrated to a spare compute node of the cluster at the next regularly taken checkpoint. Therefore, no application processing is lost, because the active compute nodes are not rolled back to their state as reflected in a prior checkpoint. Rather, at the next checkpoint, when the state of the predicted-to-fail active compute node is loaded onto the spare compute node, the other active compute nodes simply pause until migration is complete.

Furthermore, the prediction and migration process can be performed on the spare compute nodes themselves, so that additional compute resources are not required to provide such prediction and migration functionality, and instead leveraging resources (the spare compute nodes) that usually remain unused. For example, the spare compute nodes may themselves perform the prediction process in parallel. When an active compute node is predicted as likely to fail, one of the spare compute nodes removed from such processing so that the predicted-to-fail compute node can be migrated thereto.

As noted above, the failure prediction process can occur independently of regular checkpointing, which still occurs in case an active compute node unexpectedly fails without prior prediction. That is, the failure prediction process may not affect when checkpoints are regularly taken. Some applications are not amenable to varying the periodicity at which checkpoints are taken, for instance, and in other cases, configuring checkpointing can be achieved only with difficult. The techniques described herein are amenable for usage even in such contexts.

FIG. 1 shows an example cluster 100, such as an HPC cluster, which includes active compute nodes 102 and spare compute nodes 104. The active computer nodes 102 can number in the tens, hundreds, thousands, tens of thousands, or even more. By comparison, the number of spare compute nodes 104 is orders of magnitude lower, such as in the tens or hundreds.

The active compute nodes 102 each include hardware 104, such as processors, memory, and so on, some of which may be shared among the compute nodes 102, and other of which may be exclusive to a particular node 102. The spare compute nodes 104 likewise include hardware 106. The active compute nodes 102 and the spare compute nodes 104 can be of the same type, including having the same manufacturer and be of the same model, and can be blade servers or other types of compute nodes.

An application 108, which is a computer program, distributively runs on the active compute nodes 102. That is, the active compute nodes 102 execute the application 108 in parallel. Owing to the large number of active compute nodes 102, such execution may thus effectuate massively parallel processing.

The application 108 has uniquely identified ranks 110 of different rank types 112 that are assigned to various active compute nodes 102 for execution to distributively run the application 108. The ranks 110 are individual processes. A particular rank 110 runs on one active compute node 102, but there can be multiple ranks 110 of the same rank type 112 that each run on a different active compute node 102. An active compute node 102 may run one rank 110 at a given time, or more than one rank 110.

The spare compute nodes 104 do not participate in distributed execution of the application 108 in parallel with the active compute nodes 102, but rather remain on standby ready to take over for active compute nodes 102 that fail or that are predicted to fail. In the example of FIG. 1, failure prediction and migration logic 114 is also implemented on the spare compute nodes 104. However, in another implementation, the failure prediction and migration logic 114 may be implemented outside the spare compute nodes 104, such as outside or still inside the cluster 100, in which case the spare compute nodes 104 can remain unused until active compute nodes 102 fail or are predicted to fail.

The failure prediction and migration logic 114 are implemented in the example of FIG. 1 at least by the hardware 106 of the spare compute nodes 104. For instance, the logic 114 may include software that is stored on storage devices of the hardware 106 of the spare compute nodes 104 and executed by the processors of the hardware 106 of the nodes 104. The logic 114 periodically predicts whether any of the active compute nodes 102 is likely to fail, using machine learning such as a neural network, on the basis of hardware and software events regarding the compute nodes 102.

In the example of FIG. 1, the checkpoint logic 116 is implemented outside the cluster 100, but may instead be implemented by the cluster 100, such as by the active compute nodes 102 of the cluster 100. The checkpoint logic 116 is also implemented at least by hardware, such as by processors executing software from storage devices. For example, the checkpoint logic 116 can be embedded within the application code that runs on the active compute nodes 102, and which communicates with the failure prediction and migration logic 114 running on the spare compute nodes 104 of the cluster 100, or elsewhere. The checkpoint logic 116, in one implementation independently and separate from and unaffected by the failure prediction and migration logic 114, regularly takes checkpoints of the active compute nodes 102 (e.g., according to a schedule). At each checkpoint, the active compute nodes 102 pause while the logic 116 records their current states.

When the failure prediction and migration logic 114 predicts that an active compute node 102 is likely to fail, the logic 114 waits until the checkpoint logic 116 takes its next checkpoint of the active compute nodes 102. At that time, the failure prediction and migration logic 114 migrates the active compute node 102 in question to a selected spare compute node 104. If the selected spare compute node 104 is currently participating in implementation of the failure prediction logic 114, the node 104 first exits from such participation.

The failure prediction and migration logic 114 loads the state of the active compute node 102 that is predicted to fail, as just taken within a checkpoint by the checkpoint logic 116, onto the selected spare compute node 104. The active compute node 102 is then retired from the cluster 100. The active compute nodes 102, including the selected spare compute node 104 as a new such node 102, can then restart, without any prior processing having been lost in proactively migrating the now-retired node 102.

Figure 2:
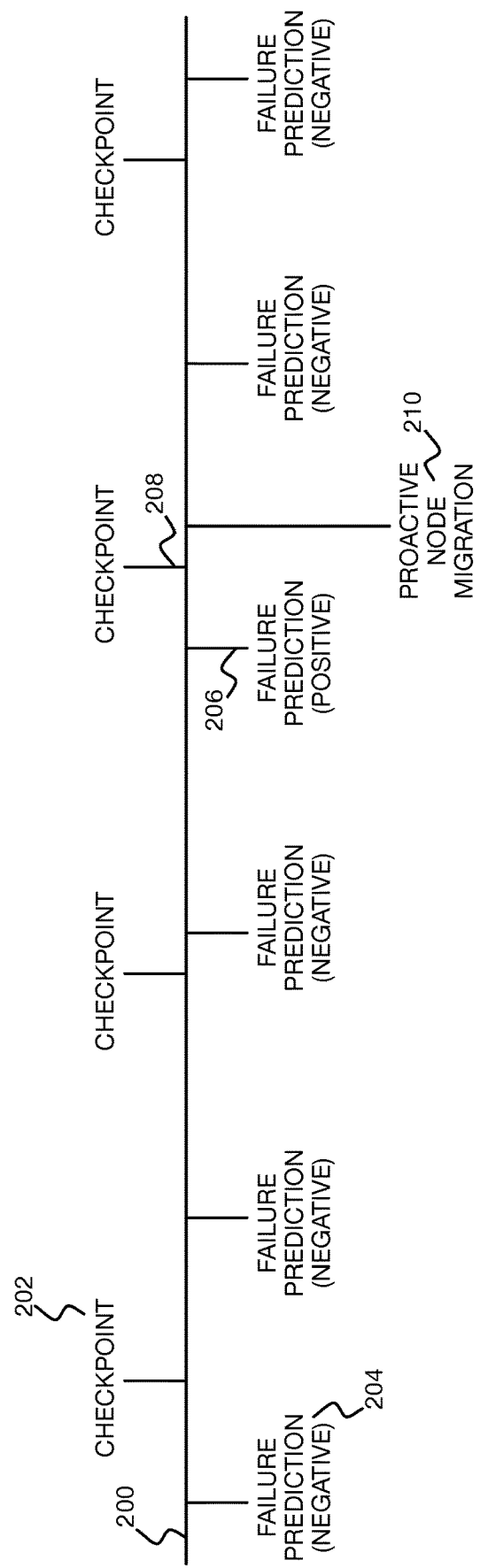
FIG. 2 is a diagram of a timeline illustrating example depiction of how node failure prediction and proactive node migration occurs vis-à-vis checkpointing.

FIG. 2 shows a timeline 200 illustrating example depiction of how node failure prediction and proactive node migration occur vis-à-vis checkpointing. Checkpoints 202 are taken by the checkpoint logic 116 of FIG. 1 at regular, periodic intervals, and failure predictions 204 are similarly made by the failure prediction and migration logic 114 of FIG. 1 at regular, periodic intervals. However, when the checkpoint logic 116 takes the checkpoints 202 can be unaffected by the failure prediction and migration logic 114, and thus independent and separate of the node failure predictions that the logic 114 makes.

In the example of FIG. 2, the frequency at which checkpoints 202 are taken is less than the frequency at which failure predictions 204 are performed, but in other situations the former frequency may be greater than the latter. In the example of FIG. 2, both frequencies are static and have not changed, but in other situations either or both can be dynamic and vary. When checkpoints 202 are taken may be hardcoded or otherwise configured within the application 108 of FIG. 1 that is being distributively executed, and may be difficult if not impossible to modify. That is, there may be no ability to force taking of a checkpoint 208.

In the example of FIG. 2, until time 206, the failure predictions 204 are negative. However, at time 206, the failure prediction 206 is positive, meaning that the failure prediction and migration logic 114 has predicted that an active compute node 102 of FIG. 1 is likely to fail. Therefore, when the checkpoint logic 116 takes the next regularly scheduled checkpoint 202 at time 208, the failure prediction and migration logic 114 performs proactive node migration 210 of the active compute node 102 that has been predicted as likely to fail to a spare compute node 104 of FIG. 1.

The time at which the proactive node migration 210 is performed is depicted in FIG. 2 along the timeline 200 as occurring slightly after the time 208 at which a checkpoint 202 is taken, since checkpointing is not an instantaneous process. However, the positive failure prediction at time 206 does not affect when this checkpoint 202 is taken (i.e., it does not specify or otherwise control the specific time 208). After proactive node migration 210 occurs, checkpointing and node failure prediction can subsequently be performed as before.

Figure 3:
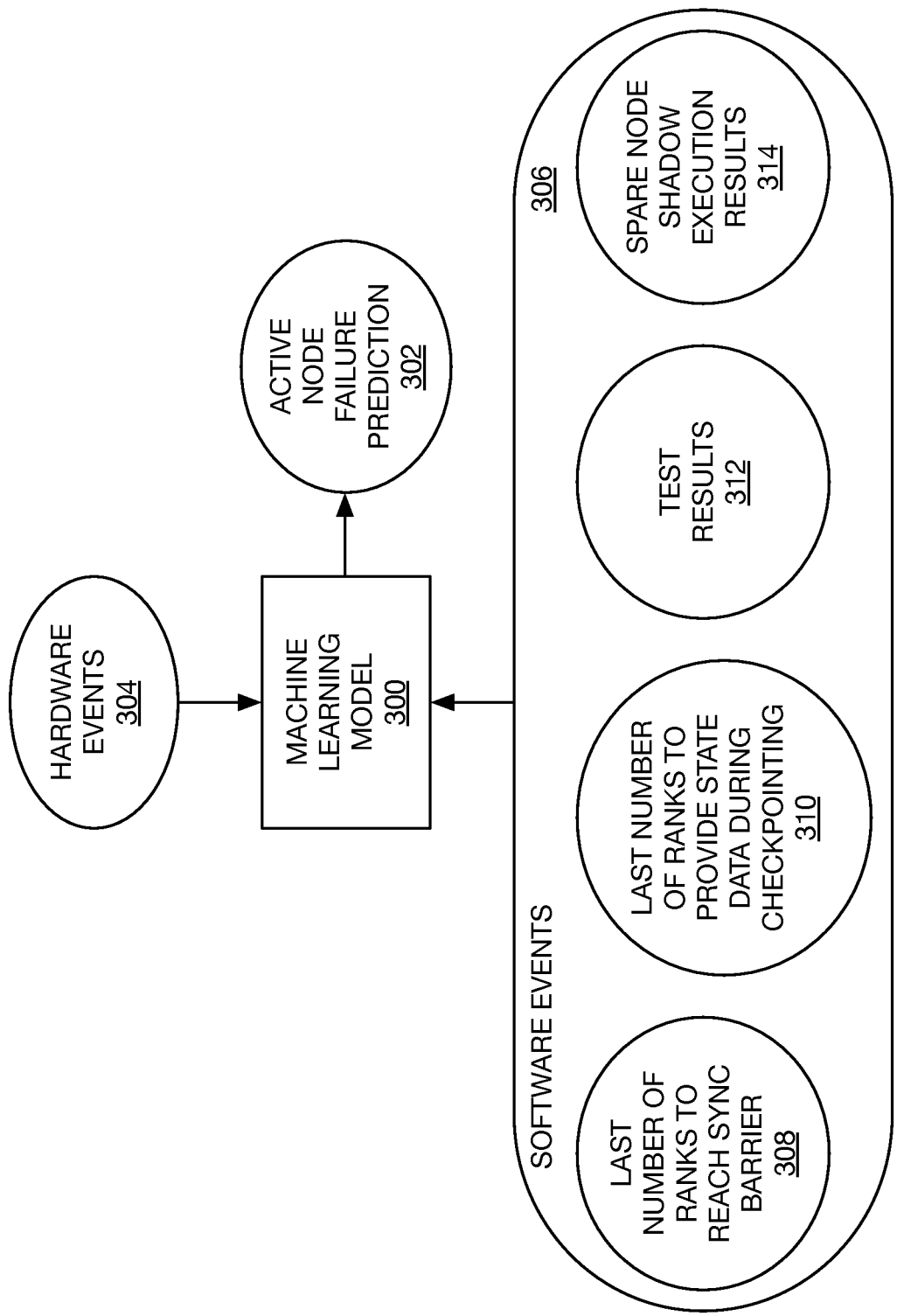
FIG. 3 is a diagram of example usage of a machine learning model to make an active compute node failure prediction.

FIG. 3 shows example usage of a machine learning model 300 to make an active compute node failure prediction 302. The machine learning model 300 can be a neural network, or another type of machine learning model. The machine learning model 300 receives as input collective hardware events 304 and software events 306 regarding the active compute nodes 102 of the cluster 100 on which the application 108 of FIG. 1 is being distributively executed in parallel. On the basis of the hardware events 304 and the software events 306, the machine learning model 300 can then make the prediction 302 that a given active compute node 102 is likely to fail.

For initial training of the machine learning model 300, training data in the form of log files of prior execution of the application 108 on the active compute nodes 102 may be employed, along with historical information as to which of the active compute nodes 102 failed during that time. That is, such log files can include the hardware events 304 and the software events 306. Once the machine learning model 300 has been trained, newly collected events 304 and 306 thus provide the basis on which the model 300 can makes an active node failure prediction 302.

The hardware events 304 can include operating temperature of each active compute node 102, internal temperature of the processors of each compute node 102, and error correction code (ECC) corrections that have been made in memory of the compute nodes 102. The hardware events 304 can include cyclic redundancy check (CRC) failure occurrences within electrical channels of the compute nodes 102 and dropped packets in network switches of the compute nodes 102. The hardware events 304 can include prior failure history of the compute nodes 102, midplane switch controller bit error occurrences within the compute nodes 102, and linkcard power module error occurrences within the compute nodes. The hardware events 304 can include other types of hardware events pertaining to the compute nodes 102 as well.

The software events 302 can include different software events, four of which are described in detail herein, including a software event 308 regarding a specified last number of ranks 110 being run on the active compute nodes 102 of FIG. 1 to reach a synchronization barrier, such as a message passing interface (MPI) synchronization barrier. When the application 108 is being distributively executed via the ranks 110 thereof being executed in parallel on the active compute nodes 102, the application 108 periodically sets synchronization barriers so that the ranks 110 remain temporally synchronized with one another. An active compute node 102 does not continue executing a rank 110 when the rank 110 reaches the barrier, until the other ranks 110 being executed by the other compute nodes 102 have as well, so that the ranks 110 remain synchronized and so that the ranks 110 can exchange information with one another on which continued execution may be predicated.

A specified number of the last ranks 110 to reach the synchronization barrier are thus recorded. For instance, the last three ranks 110 to reach the barrier may be recorded. If the difference in the time for such a rank 110 to reach the barrier and the times for other ranks 110 of the same type 112 to reach the barrier is greater than a threshold, then this may be indicative of an underlying issue with the active compute node 102 executing the offending rank 110. That is, the active compute node 102 in question has a greater likelihood of failure.

The software events 302 can include a software event 310 regarding a specified last number of ranks 110 being run on the active compute nodes 102 of FIG. 1 to provide state data during checkpointing. When checkpointing occurs, the checkpoint logic 116 requests that each rank 110 provide its current state, and the logic 116 then stores the current states that the ranks 110 provide. The active compute nodes 102 can then be later rolled back to this checkpoint, or the failure prediction and migration logic 114 can load the state data of the ranks 110 running on an active compute node 102 predicted to likely fail onto a spare compute node 110 to migrate the active compute node 102 in question to the spare compute node 110.

A specified number of the last ranks 110 to provide the requested state data during checkpointing are thus recorded. For instance, the last three ranks 110 to provide their state data may be recorded. If the difference in the time for such a rank 110 providing its state data at a checkpoint and times for other ranks 110 of the same type 112 to provide their state data during at this checkpoint is greater than a threshold, then this may be indicative of an underlying issue with the active compute node 102 executing the offending rank 110. That is, the active compute node 102 in question has a greater likelihood of failure.

The software events 302 can include a software event 312 regarding execution results of a "canary" test periodically run on each active compute node 102 of FIG. 1. A canary test is a test that can representatively reveal hardware problems of an active compute node 102, without having to completely test all the particular type of hardware in question. For example, a full memory check of the memory of an active compute node 102 can take nearly an hour if the amount of memory is large, such as twenty terabytes. However, running an instrument twenty terabyte sort test may identify an underperforming memory module within a few minutes.

The underperforming memory module may otherwise be difficult to detect, particularly as to the hardware of the active compute node 102 in question that is likely to fail. Error correction provided in the memory itself can mask the problem, but such error correction would slow performance of the sort test. If the results of an active compute node 102 performing such a test have significantly decreased over time—including slowly or immediately—or if these results are worse than corresponding results of the other active compute nodes 102, then the active compute node 102 in question may be predicted as likely to fail.

The software events 302 can include a software event 312 regarding results of shadow execution of the ranks 110 running on an active compute node 102 by a spare compute node 104 of FIG. 1. For instance, at the time of checkpointing, the state of a selected active compute node 102 may be loaded onto a spare compute node 104, even though the active compute node 102 has not been predicted as likely to fail. The spare compute node 104 does not take over for the active compute node 102 once checkpointing is completed, such that the active compute node 102 is not migrated to the spare compute node 104.

Rather, the spare compute node 104 "shadows" the active compute node 102, executing the same ranks 110 based on the same data as the active compute node 102 is executing these ranks 110. The performance of the active compute node 102 executing the ranks 110 can thus be compared to the performance of the spare compute node 104 executing these ranks 110. If the active compute node 102's performance is worse than the spare compute node 104's performance in executing the same ranks 110, then this may be indicative of an underlying issue with the active compute node 102. That is, the active compute node 102 in question has a greater likelihood of failure.

The performance of the tests of the software events 312 and 314 can be considered as part of the failure prediction process that the failure prediction and migration logic 114 of FIG. 1 performs. As noted above, the number of spare compute nodes 104 is orders of magnitude less than the number of active compute nodes 102. Therefore, as to the software event 314, which active compute node or nodes 102 are to be shadowed by the spare compute nodes 104 at a given time may be randomly selected, selected in a round-robin manner, and so on.

Figure 4:
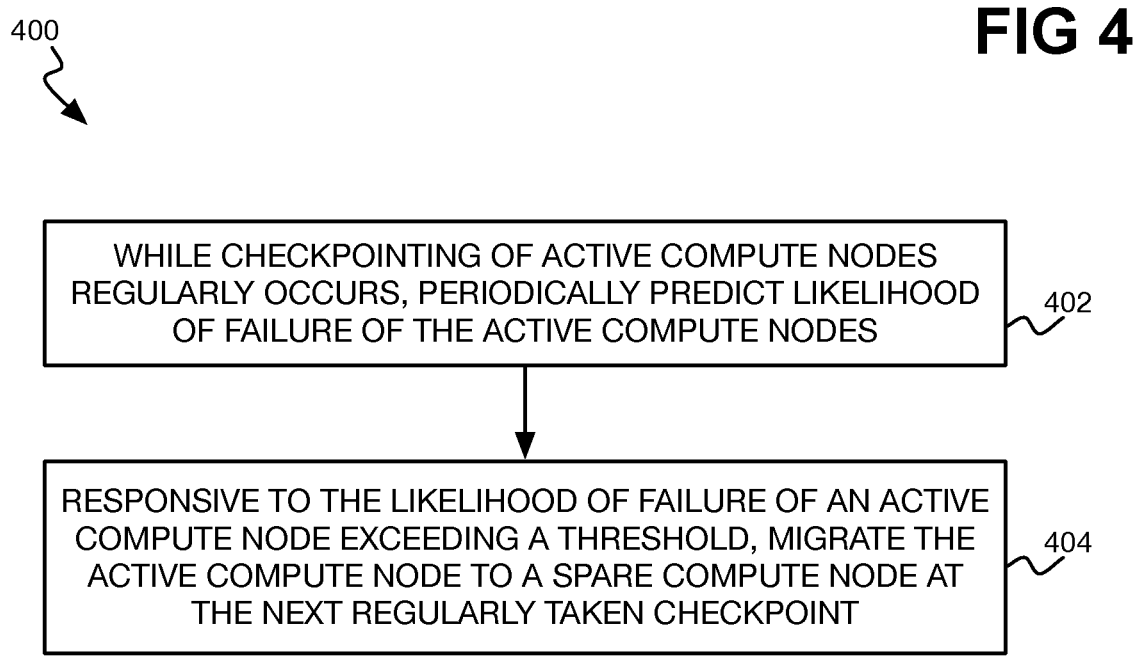
FIG. 4 is a flowchart of an example method.

FIG. 4 shows an example method 400. The method 400 can be implemented as instructions or other program code stored on a non-transitory computer-readable data storage medium and executed by a processor. For instance, the processor and the storage medium may implement the failure prediction and migration logic 114 of FIG. 1. The failure prediction and migration logic 114 can therefore perform the method 400, and the method 400 is described as such.

While the checkpoint logic 116 regularly checkpoints the active compute nodes 102 of FIG. 1, the failure prediction and migration logic 114 independently and separately from this checkpointing periodically predicts the likelihood of failure of each active compute node 102 (402). The logic 114 uses machine learning to make its prediction, as has been described above in relation to FIG. 3. As such, the logic 114 can predict whether the active compute nodes 102 are likely to fail based on both hardware events 304 and software events 306.

Responsive to the failure prediction and migration logic 114 determining that the likelihood of failure of an active compute node 102 exceeds a threshold, the logic 114 proactively migrates the active compute node 102 in question to a spare compute node 104 the next time the checkpoint logic 116 takes a regular checkpoint (404). The failure prediction and migration logic 114 can then repeat the method 400, migrating active compute nodes 102 to spare compute nodes 104 as they are deemed as likely to fail by more than a threshold. Therefore, in the ways that have been described herein, proactive migration occurs, which means that no processing results are lost as in the case when rollback occurs responsive to an actual node failure.

We claim:

1. A method comprising:
   while scheduled checkpoints are being taken of a cluster of active compute nodes distributively executing an application in parallel, periodically predicting independently of the scheduled checkpoints, by a processor, a likelihood of failure of each active computing node based on hardware events and software events regarding the active compute nodes, wherein the software events comprise a last number of ranks of the application that reach a synchronization barrier during execution of the application; and
   responsive to the likelihood of failure of a given active compute node exceeding a threshold, proactively migrating, by the processor, the given active compute node to a spare compute node of the cluster at a next scheduled checkpoint;
   wherein the likelihood of failure is determined by a difference between a time at which each rank of the last number of ranks reached the synchronization barrier and times at which other ranks of a same type reached the synchronization barrier being greater than a threshold time.

2. The method of claim 1, wherein predicting the likelihood of failure of each active computing node does not affect when the checkpoints are taken.

3. The method of claim 1, wherein the spare compute node is a first spare compute node of the cluster,
   and wherein the processor predicting the likelihood of failure of each active computing node and proactively migrating the given active compute node to the first spare compute node is a part of a second spare compute node of the cluster.

4. The method of claim 1, wherein the software events comprise:
   a last number of ranks of the application that provide state data when the checkpoints are being taken,
   wherein a difference between a time at which each rank of the last number of ranks provided the state data and times at which other ranks of a same type provided the state data being greater than a threshold time is indicative of a greater likelihood of failure of the active computing node executing the rank.

5. The method of claim 1, wherein the software events comprise:
   performance results of a software test periodically executed on the active compute nodes representatively revealing hardware problems of the active compute nodes.

6. The method of claim 1, wherein the spare compute node is a first spare compute node, and wherein the software events comprise:
   shadow execution on a second spare compute node of tasks regarding the application that a selected active compute node is executing,
   wherein a difference between execution time of the shadow execution of the tasks on the second compute node and execution time of execution of the tasks on the selective active compute node is indicative of a greater likelihood of failure of the selected active compute node.

7. A system comprising:
   a cluster of compute nodes, including active compute nodes to distributively execute an application in parallel, a first spare compute node, and a second spare compute node;
   checkpoint logic to regularly checkpoint the active compute nodes; and
   failure prediction and node migration logic to:
      periodically predict a likelihood of failure of the active compute nodes using machine learning, and
      responsive to the likelihood of failure of a given active compute node exceeding a threshold, migrate the selected given active compute node to the first spare compute node after the checkpoint logic next regularly checkpoints the active compute node,
   wherein the failure prediction and node migration logic operates independently of the checkpoint logic;
   wherein the failure prediction and node migration logic is to predict the likelihood of failure of the active compute nodes based on hardware events and software events regarding the active compute nodes;
   wherein the software events comprise shadow execution, on the second spare compute node, of tasks regarding the application that a selected active node is executing; and
   wherein a difference between execution time of the shadow execution of the tasks on the second compute node and execution time of execution of the tasks on the selective active compute node is indicative of a greater likelihood of failure of the selected active compute node.

8. The system of claim 7, wherein the failure prediction and node migration logic does not affect when the failure prediction and node migration logic checkpoints the active compute nodes.

9. The system of claim 7, wherein the spare compute node is a first spare compute node of the cluster,
   and wherein the cluster further comprises a second spare compute node including the failure prediction and node migration logic.

10. The system of claim 7, wherein the software events comprise:
    a last number of ranks of the application that reach a synchronization barrier during execution of the application,
    wherein a difference between a time at which each rank of the last number of ranks reached the synchronization barrier and times at which other ranks of a same type reached the synchronization barrier being greater than a threshold time is indicative of a greater likelihood of failure of the active compute node executing the rank.

11. The system of claim 7, wherein the software events comprise:
a last number of ranks of the application that provide state data when the checkpoints are being taken,
wherein a difference between a time at which each rank of the last number of ranks provided the state data and times at which other ranks of a same type provided the state data being greater than a threshold time is indicative of a greater likelihood of failure of the active computing node executing the rank.

12. The system of claim 7, wherein the software events comprise:
performance results of a software test periodically executed on the active compute nodes representatively revealing hardware problems of the active compute nodes.

13. A non-transitory computer-readable data storage medium storing instructions executable by a processor to:
predict a likelihood of active compute nodes of a cluster that are distributively executing an application in parallel, based on a software event selected from a group of software events comprising:
a last number of ranks of the application that reach a synchronization barrier during execution of the application;
a last number of ranks of the application that provide state data when the checkpoints are being taken;
shadow execution on a second spare compute node of tasks regarding the application that a selected active compute node is executing; and
responsive to the likelihood of failure of a given active compute node exceeding a threshold, proactively migrate the given active compute node to the spare compute node of the cluster at a next checkpoint of the active compute nodes.

14. The non-transitory computer-readable data storage medium of claim 13, wherein prediction of the likelihood of failure of the active computing nodes is independent of and does not affect checkpointing of the active compute nodes.

15. The non-transitory computer-readable data storage medium of claim 13, wherein the spare compute node is a first spare compute node of the cluster,
and wherein the processor predicting the likelihood of failure of the active computing nodes and proactively migrating the given active compute node to the first spare compute node is a part of a second spare compute node of the cluster.

16. The non-transitory computer-readable data storage medium of claim 13, wherein prediction of the likelihood of failure of the active computing nodes is also based on hardware events regarding the active compute nodes.

* * * * *